(12) United States Patent
P et al.

(10) Patent No.: US 11,816,589 B2
(45) Date of Patent: Nov. 14, 2023

(54) PERFORMANCE THROTTLING IDENTIFICATION SERVICE FOR AUTONOMOUS DATABASES AS A SERVICE

(71) Applicant: SAP SE, Walldorf (DE)

(72) Inventors: Meenakshi Sundaram P, Walldorf (DE); Mayank Tiwary, Rourkela (IN); Pritish Mishra, Odisha (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 608 days.

(21) Appl. No.: 16/744,502

(22) Filed: Jan. 16, 2020

(65) Prior Publication Data
US 2021/0224675 A1    Jul. 22, 2021

(51) Int. Cl.
*G06F 16/21*     (2019.01)
*G06N 3/06*      (2006.01)
*G06N 20/00*     (2019.01)
*G06N 7/01*      (2023.01)
*G06N 5/02*      (2023.01)

(52) U.S. Cl.
CPC ............. *G06N 7/01* (2023.01); *G06F 16/217* (2019.01); *G06N 5/027* (2013.01)

(58) Field of Classification Search
CPC ........ G06N 7/005; G06N 5/027; G06N 3/006; G06N 20/00; G06F 16/217
USPC ....................................................... 707/802
See application file for complete search history.

(56) References Cited

U.S. PATENT DOCUMENTS

| 6,035,306 A | * | 3/2000 | Lowenthal | .............. G06F 11/32 |
| 2018/0336240 A1 | * | 11/2018 | Bellizia | ................. H04L 67/141 |
| 2019/0095470 A1 | * | 3/2019 | Dundjerski | ........... G06F 11/079 |

OTHER PUBLICATIONS

Oracle® Database Performance Tuning Guide (11g Release 2 (11.2), Aug. 2010, Oracle, Primary Authors Immanuel Chan and Lance Ashdown, hereafter "OraTune11g2" (Year: 2010).*

* cited by examiner

*Primary Examiner* — Kuen S Lu
(74) *Attorney, Agent, or Firm* — Buckley, Maschoff & Talwalkar LLC

(57) ABSTRACT

A system and method are disclosed associated with a cloud platform as a service provider. A monitoring agent, associated with a database service instance running on a client database virtual machine, periodically executes a performance throttling detection engine. The performance throttling detection engine gathers database statistics based on metrics and features of the database service using a rule-based approach. When it is determined that a pre-determined condition is met, the system may transmit the gathered database statistics to an external application. For example, the external application might comprise a database tuning service and the pre-determined condition may be associated with a decision that the database service may potentially need to tune knob configuration parameters (associated with memory knobs, background writer knobs, asynchronous knobs, etc.).

15 Claims, 11 Drawing Sheets

PERFORMANCE THROTTLING IDENTIFICATION SERVICE FOR AUTONOMOUS DATABASES AS A SERVICE

BACKGROUND

An enterprise, such as a service provider, may use a cloud computing offering to run applications and/or to provide services. For example, a Platform-as-a-Service ("PaaS") offering might process purchase orders, perform human resources functions, etc. In some cases, the service being provided is associated with a DataBase Management System ("DBMS"). The performance of a PaaS may vary based on the workload being processed. For example, Central Processing Unit ("CPU") usage, memory usage, disk latency, etc. may result in the performance of the PaaS being "throttled" (e.g., the performance of the system may be slowed down substantially). Monitoring the performance of the PaaS (e.g., by collecting database statistics) may let the cloud computing offering identify and/or correct potential problems with the PaaS. Frequently reporting database statistics, however, can be a substantial task. For example, in some cases, a DBMS may have hundreds of configuration "knobs" that control operation of the system, such as: an amount of memory to use for caches, how often data is written to storage, how often the logs are written to disk, a maximum size of log files, a maximum number of parallel connections permitted, a number of dirty buffers to be written by the background writer, etc. Properly adjusting or tuning DBMS configuration knobs based on the application's workload and the hardware ability can substantially influence the performance of the system. Deciding when PaaS performance is being hampered (and, as a result, that various knobs might need to be re-adjusted or tuned), however, can be a time consuming and complicated task. It would therefore be desirable to provide a performance throttling identification service for an autonomous database as a service in a fast, automatic, and accurate manner.

SUMMARY

According to some embodiments, methods and systems may be associated with a cloud platform as a service provider. A monitoring agent, associated with a database service instance running on a client database virtual machine, periodically executes a performance throttling detection engine. The performance throttling detection engine gathers database statistics based on metrics and features of the database service using a rule-based approach. When it is determined that a pre-determined condition is met, the system may transmit the gathered database statistics to an external application. For example, the external application might comprise a database tuning service and the pre-determined condition may be associated with a decision that the database service may potentially need to tune knob configuration parameters (associated with memory knobs, background writer knobs, asynchronous knobs, etc.).

Some embodiments comprise: means for periodically executing, by a monitoring agent associated with a database service instance running on a client database virtual machine, a performance throttling detection engine; means for gathering, by the performance throttling detection engine, database statistics based on metrics and features of the database service using a rule-based approach; means for identifying a point where the database service may potentially need to tune knob configuration parameters; and, when it is determined that knob configuration parameters should be tuned, means for transmitting the gathered database statistics to a database tuner as a service.

Some technical advantages of some embodiments disclosed herein are improved systems and methods to provide a performance throttling identification service for an autonomous database as a service in a fast, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
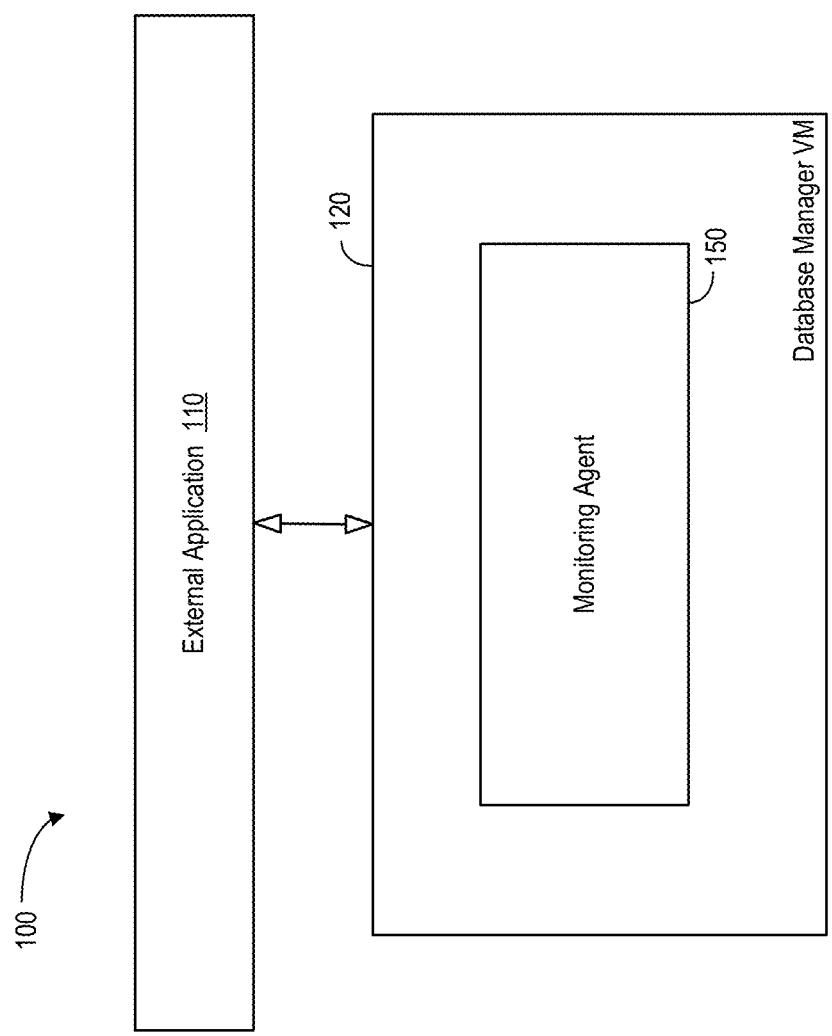
FIG. 1 is a system in accordance with some embodiments.

Some embodiments described herein may facilitate a performance throttling identification for an Autonomous Database as a Service ("AutoDBaaS"). For example, FIG. 1 is a system 100 including an external application 110 that exchanges information with a database manager Virtual Machine ("VM") 120 in accordance with some embodiments. The database manager VM 120 executes a monitoring agent 150 in accordance with any of the embodiments described herein.

Note that an external application 110 associated with a typical database tuning service would periodically tune a database. For example, a tuning service might periodically fetch metrics and knobs from a database by making Java Database Connectivity ("JDBC") calls, process the metrics and knobs, and recommend a new knob values if appropriate. This might be performed, for example, every five to ten minutes. This period cannot be increased to a more frequent value because that would reduce the dynamic tuning value (and there is a high chance that the Structured Query Language ("SQL") workload will have changed within the time frame resulting in suboptimal knobs). At the tuner side, this periodic tuning may substantially limit the system in terms of scalability. Consider, for example, a system with a tuner that initiates a tuning job every ten minutes on a database (even when the database does not requires a tuning, such as when there is no load or almost zero load). The tuner fetches knobs and metrics from the underlying database, feeds the information to a Machine Learning ("ML"), Deep Learning ("DL"), and/or Neural Network ("NN") pipeline, and produces recommendation. A ML pipeline might, in some cases, take a few minutes to generate one recommendation. As a result, a single tuner instance is only able to tune two or three databases.

Figure 2:
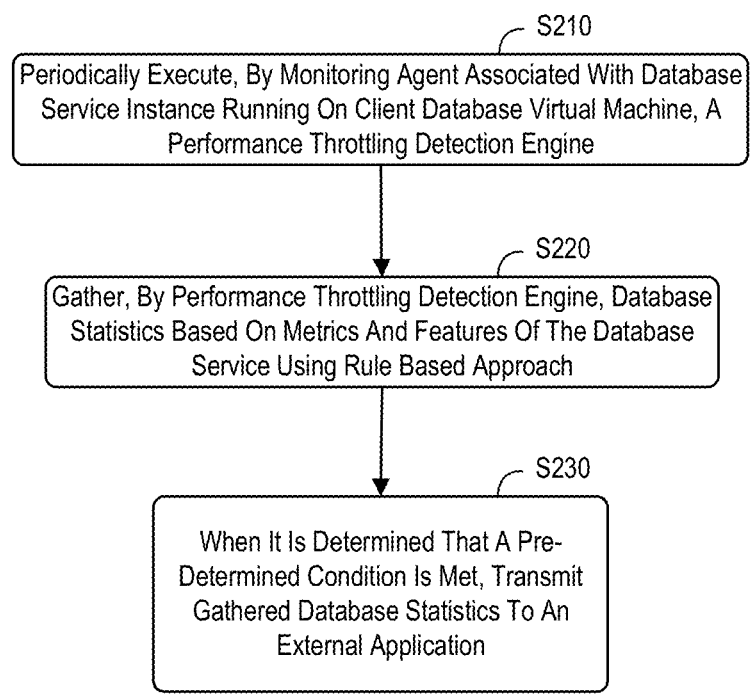
FIG. 2 is a method according to some embodiments.

FIG. 2 illustrates a method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a monitoring agent associated with a database service instance running on a client database virtual machine may periodically execute a performance throttling detection engine. At S220, the performance throttling detection engine may gather database statistics based on metrics and features of the database service using a rule-based approach (e.g., associated with ML). As used herein, the term "statistics" may refer to any type of database performance metric. When it is determined that a pre-determined condition is met, at S230 the system may transmit the gathered database statistics to an external application (e.g., a performance evaluation application).

Figure 3:
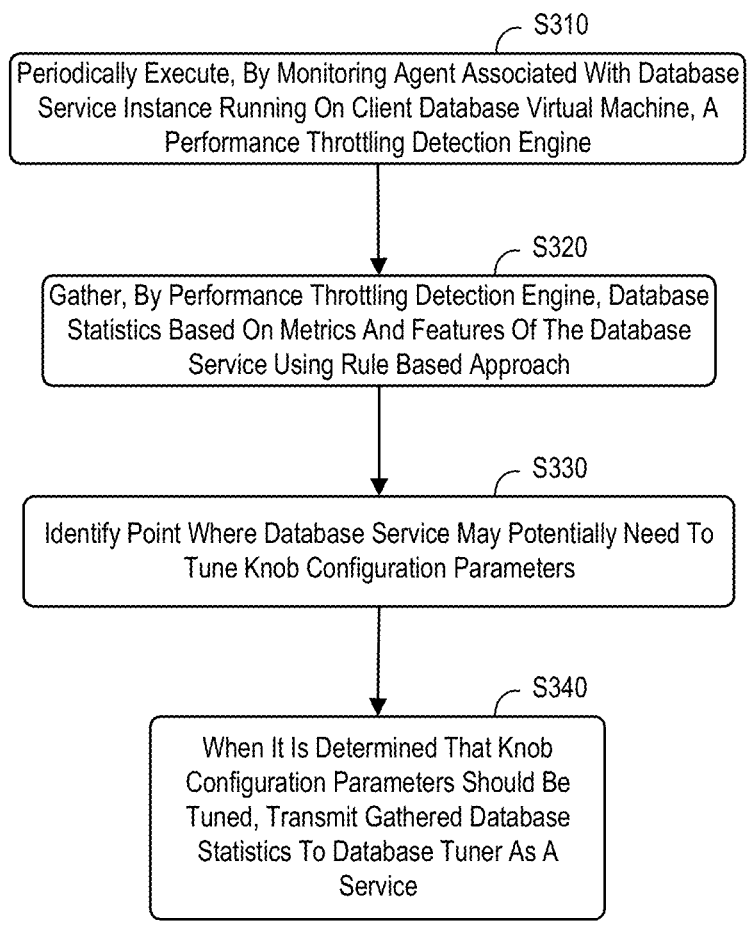
FIG. 3 is a method where performance throttling identification may be used in connection with knob tuning in accordance with some embodiments.

In some embodiments, the external application might comprise a database tuning service and the pre-determined condition may be associated with a decision that the database service may potentially need to tune knob configuration parameters (associated with memory knobs, background writer knobs, asynchronous knobs, etc.). FIG. 3 is a method where performance throttling identification may be used in connection with knob tuning in accordance with some embodiments. At S310, a monitoring agent associated with a database service instance running on a client database virtual machine may periodically execute a performance throttling detection engine. At S320, the performance throttling detection engine may gather database statistics based on metrics and features of the database service using a rule-based approach. At S330, the system may identify a point where the database service may potentially need to tune knob configuration parameters. When it is determined that knob configuration parameters should be tuned, at S340 the system may transmit the gathered database statistics to a database tuner as a service.

Thus, some embodiments may break down the periodic tuning approach and enable the database itself to figure out when a workload pattern changes. The database may then request a tuning only when needed. In some embodiments, scripts run on periodic basis in the database VM itself, which figures out whether or not a database needs a tuning. In other words, the scripts may determine performance throttling in a database based on the executing workload and current values of knobs.

In some cases, performance throttling may be responsible for identifying the database insufficiency to process SQL queries because of knobs that are not configured appropriately. Some embodiments may classify the knobs into different classes and then, for each class of knobs, predict throttling. Such an approach may therefore increase the scalability of the tuner employment by reducing the number of recommendation requests. That is, the underlying services request a tuning recommendation only when performance throttling is detected. Thus, such a module may act as a Database Administrator ("DBA") and identify when a database requires an actual tuning.

Moreover, there is typically no way to validate a value of a given recommendation from a tuning service. Some embodiments described herein may validate the value of a recommendation (e.g., based on a number of performance throttles triggered after applying the recommendation). Still further, throughput may vary randomly in production systems and new performance metrics may be identified to help compare the effectiveness of obtained recommendations. To achieve this, embodiments may introduce a number of throttles triggered by the performance throttling module as a metric.

According to some embodiments, database knobs may be divided into three classes:
Memory Knobs,
Background Writer Knobs, and
Async/Planner-Estimate Knobs.

Figure 4:
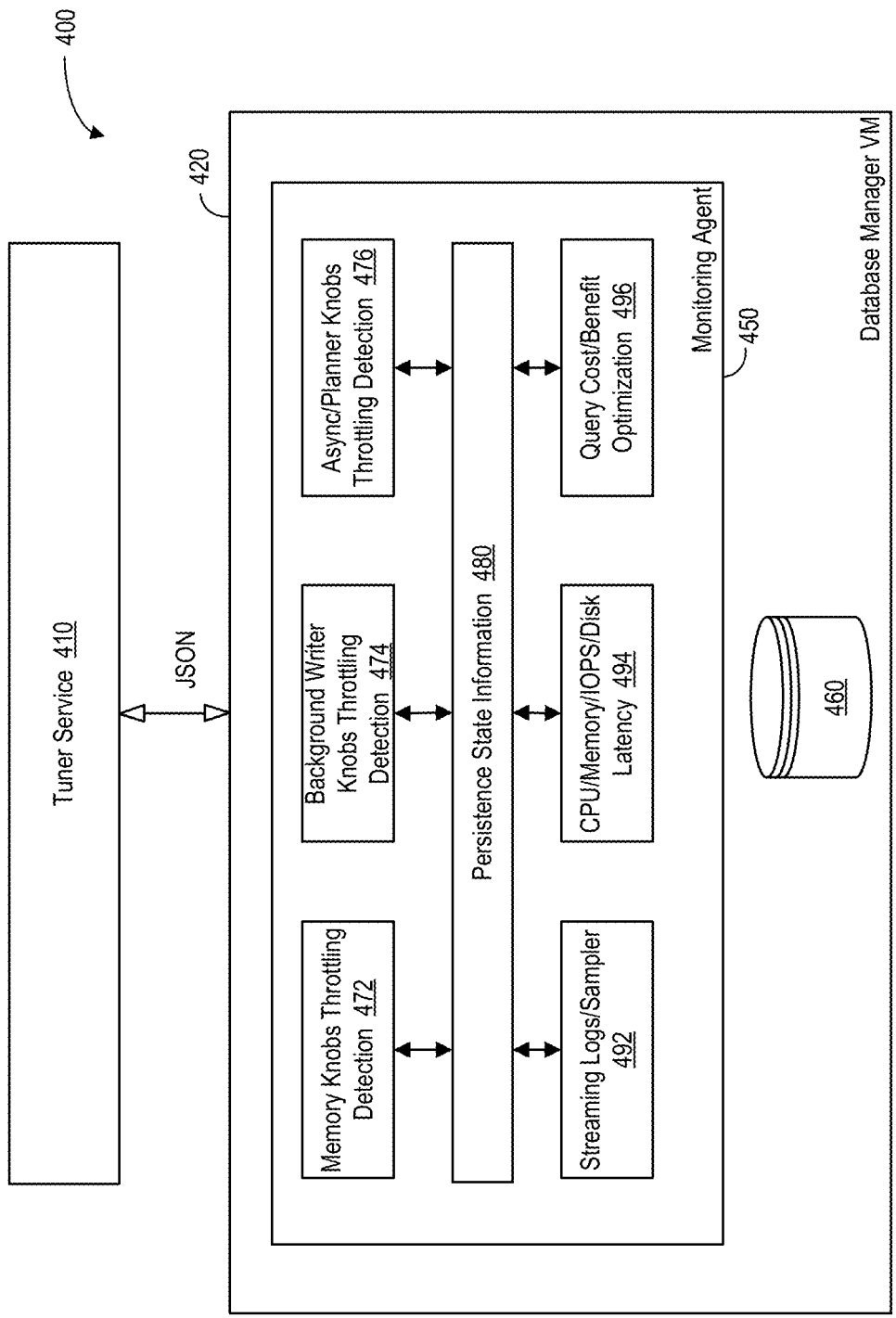
FIG. 4 is an overall generic architecture for throttling detection according to some embodiments.

FIG. 4 is an overall generic architecture 400 for throttling detection according to some embodiments. The architecture 400 includes a tuning service 410 that exchanges information (e.g., JavaScript Object Notation ("JSON") information) with a database manager VM 420 with a monitoring agent 450 and a database 460. The monitoring agent 450 includes memory knobs throttling detection 472, background writer knobs throttling detection 474, and asynchronous/planner knobs throttling detection 476 coupled to persistence state information 480. The persistence state information 480 is also coupled to a streaming logs/sampler 492, a CPU/memory/Input Output ("IO") Operations (IOPS)/disk latency 494, and a query cost/benefit optimization 496.

Thus, the monitoring agent 450 may run on the database manager VM 420. The monitoring agent 450 runs the performance throttling identification scripts 472, 474, 476 (i.e., parallel threads execute scripts for memory knobs, background writer knobs and async/planner knobs). These scripts may make calls to a database 460 using inter-process communication domain sockets (e.g., to avoid the kernel's network stack) instead of network sockets. The monitoring agent 450 also persists its state locally on the same VM 420. The monitoring agent 450 collects query logs from local storage (a simple file access), collects metrics such as CPU, memory, IOPS, disk-latency, etc., and also collects query plans (for queries sampled from query logs) by making calls to a database query planner. The monitoring agent 450 may then figure out when a tuning is required for the database 460 and trigger a recommendation request to the tuning service 410.

According to some embodiments, the monitoring agent 450 may trigger a recommendation request when any of class of database knobs seem to be facing a throttle. The working of each sub-module is different as will now be explained.

In connection with the memory knobs throttling detection 472, memory knobs are the set of knobs which are dependent upon the resource (VM or container) hardware limits. The major portion of memory used by the database is utilized to keep the data in buffer. One of the approaches for identifying throttles caused due to this could be to find out the actual working database size. To identify this, the system may use gauging techniques to identify the actual working page set. However, the major challenge with this knob is encountered while attempting to update this knob, since it requires a restart of the database to be applied, and this causes a violation of the zero-downtime Service Level Agreement ("SLA") for PaaS offerings. A Throttling Detection Engine ("TDE") collects this information and keeps on sending it to configuration director instances, where configdirector collects the number of throttles and checks the size of the working page set and adjusts this knob value only during the scheduled maintenance downtime.

The other knobs belonging to this segment are related to working area of the database. The knobs related to the working area of memory depends upon the total number of active connections and if it is found to be in-sufficient, then database uses disk or system swap space to perform work operations like sorting, or maintenance operations like index-creation, storing temporary tables, table alter, etc. For figuring out the disk usage while query execution, the query plans can be used as a potential source of information. Analyzing each and every query can cause substantial overhead on production systems. As a result, embodiments may reduce the query for analysis of cost/benefits to trigger a throttle event. The system may use query templating to reduce the total queries, where the queries are converted to a template having a template-id. The queries collected from streaming logs are pre-processed and then converted to generic templates (having no actual parameters/arguments). The final template selection takes place from the pool of queries by reservoir sampling (for capturing samples from streaming logs) where the window length is at-least 50 to 100. The selected query templates undergo execution plan evaluation by substituting the actual (most frequent) parameters to the template. From the plans/streaming logs, it can be easily inferred how much memory/disk the query is going to take. If any of the selected templates (from reservoir sampling) uses disk while execution, signifies that the memory is in-sufficient for execution of queries and now the TDE triggers a memory-based throttle signal and asks for knob recommendation from a tuning service such as Ottertune.

Note, however, that there can be potential cases when the memory allocated for the buffer is maximum (which means the memory left for other processes become less), it is observed that TDE un-necessary triggers throttle signals. This is a case, where the underlying instance configuration limit is in-sufficient (or the usage has reached the caps limit). When the size of the database is sufficiently higher than the actual memory allocated to database process, there are more chances that the TDE frequently triggers throttle signals. To deal with this case, the system may use a filtration approach which stops and identifies the un-necessary throttles (one potential case is the underlying VM hardware resource is in-sufficient and customer needs to upgrade to another plan or ask for more resources for the VM). The system may face the following challenges when designing these filters:

There are a specific set of queries which trigger a throttle from one memory knob (like use of aggregate queries triggers a throttle from work_mem in PostgreSQL). Situations like this can cause increasing work_mem continuously with each recommendation obtained and hence decreasing other knobs (to make room for increase of work_mem). However, even after increasing the knob limit has reached the caps, but still throttles are getting triggered. These situations are captured by rules and throttles can be filtered.

Fer certain queries, consecutive throttles may be observed intermittently against different knobs. For example, the first two throttles might come from work mem and next two throttles come from maintenance work mem. This becomes very difficult to manage and identify with a rule-based approach especially when there are a substantial number of knobs.

There are a specific set of queries which trigger throttle from more than one set of knobs (like use of aggregate queries, index creation queries, temp table creation queries, etc. causes trigger of throttle from multiple knobs). Situations like this are difficult to be captured by rule-based engine and needs a different approach.

Such queries were observed and collected and Table I shows the results. In PostgreSQL, work_mem is used by the execution engine to perform internal-sorting, joins, hashtables, etc. The system evaluated amount of work_mem used by TPCC and CH-Bench, YCSB and Wikipedia bench in absence of indexes. It was observed that Wikipedia and YCSB queries do not use work mem (due to absence of complex queries like aggregate, joins, and order-by). Table 1 illustrates the actual work_mem allocated and the amount of disk and memory used by queries. A decrease in execution time was observed when increasing work mem as per obtained recommendation from tuner for the same set of queries.

TABLE I

| Benchmark - query type | Work mem (MB) | Disk Space (in MB) | Memory Utilized (MB) | Latency (ms) |
| --- | --- | --- | --- | --- |
| tpcc - scan query | 0.5 | 3 | 0.5 | 8310 |
| tpcc - scan query | 1 | 0 | 0.64 | 3953 |
| ch-bench - scan query | 125 | 260 | 125 | 15413 |
| ch-bench - scan query | 150 | 0 | 137 | 6801 |
| tpcc - complex aggregation query | 350 | 475 | 350 | 53013 |
| tpcc - complex aggregation query | 375 | 0 | 367 | 19835 |

In this case, a probabilistic approach may be needed to predict the pattern of SQL queries which can cause a potential throttle in performance. The queries that cause more use of working memory are mostly join, aggregate queries, sorting queries (ORDER BY). On production systems, the frequency of rest queries like index creation or alter table is comparatively lesser. The worst-case scenarios could be all queries are fired with similar proportion. To deal with such cases, or to identify such randomness/query proportion, entropy may be used. Entropy of a discreet variable X with possible outcomes $x_1, x_2, x_3, \ldots, x_n$ can be defined as:

$$H(X) = \sum_{i=1}^{n} p(x_i) \log_2 \left( \frac{1}{p(x_i)} \right)$$

where $p(x_1)$ is the probability of the ith outcome of X With a more abstract approach, a generalized entropy can be defined as:

$$H_\alpha(X) = \frac{1}{\alpha - 1} \log_2 \sum_{i=n}^{N} p(x_i)$$

When the value of α equals 0, the maximum value of generated information is achieved. With different values of α, different types of entropy values are obtained. The queries are grouped into specific categories (grouping of obtained query templates), such as join queries, select queries, alter-table queries, Update queries, etc. and a hash table is built for each category. The hash table contains the class of queries and its frequency. Once the entropy value is evaluated, it can be interfered from multiple observations, that the entropy value is less when high randomness is present, or all queries are fired with similar proportion. This indicates the SQL queries will, probably, again trigger a throttle (when underlying instance configuration is in-sufficient). However, if the entropy value is high, the degree of randomness is quite less (which is often seen on production systems). Thus, provided, if the query class, which is constrained by throttles, has less frequency, it can be concluded that in future, the throttles will not be triggered (as here the limits have not reached the caps and the underlying database depends on the tuner recommendation for knob optimization).

Figure 5:
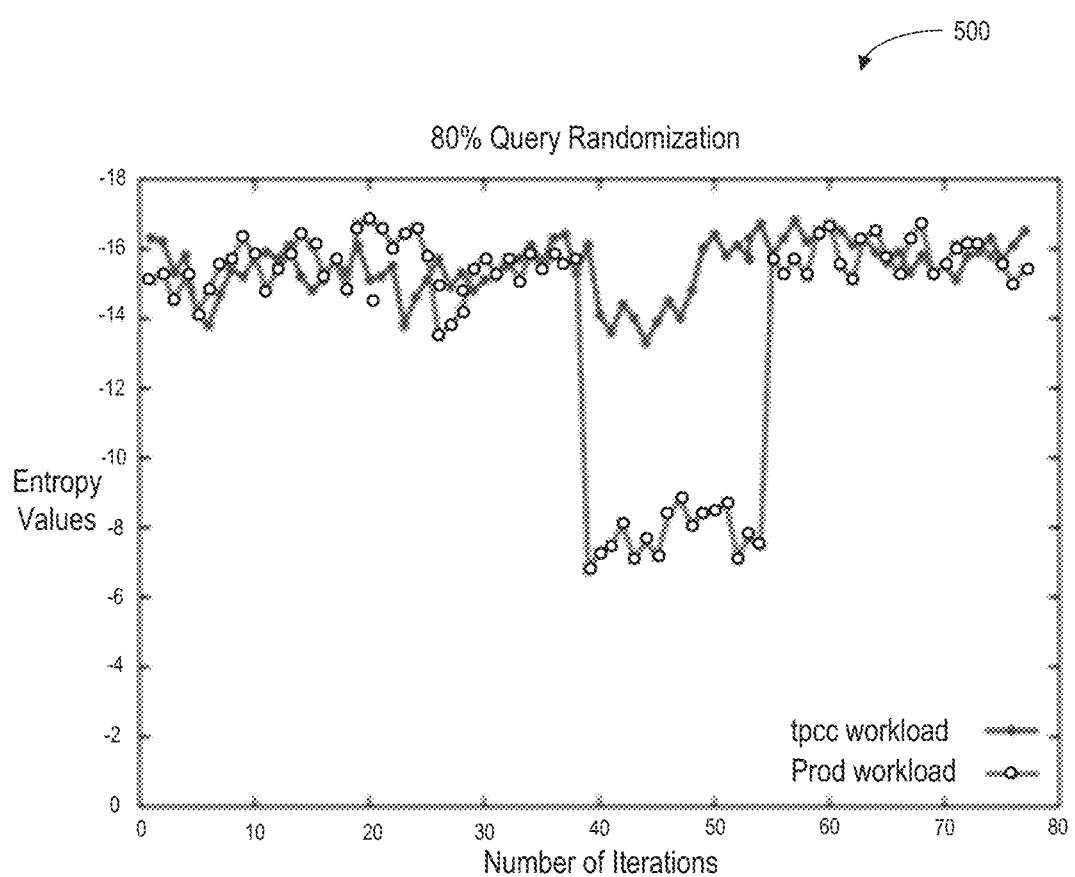
FIG. 5 is a graph illustrating entropy variation with an 80% adulteration probability on a production SQL workload in accordance with some embodiments.
Figure 6:
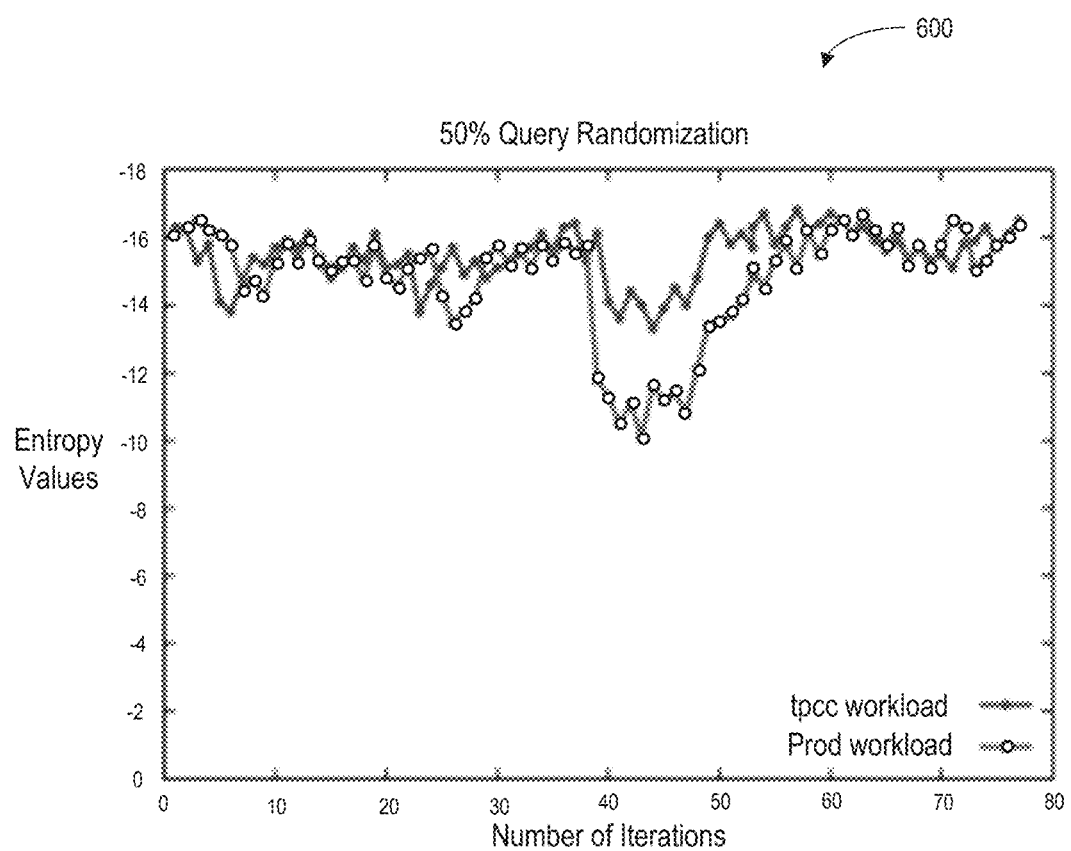
FIG. 6 is a graph illustrating entropy variation with a 50% adulteration probability on a production SQL workload according to some embodiments.

As part of a proposed flow, if more than eight throttles are triggered consecutively, the entropy value is evaluated, and if the entropy value is higher along-with the memory-knobs reaching maximum cap value, the TDE triggers a plan update (increasing the hardware limits of instance) request to customer and recommendation requests are not sent to configuration director. Otherwise, it is estimated that the throttles will soon reduce, and the same job waits for next eight throttles before calculating the next entropy value. The graphs 500, 600 shown in FIGS. 5 and 6 illustrate the calculated entropy values while executing TPCC and an adulterated TPCC workload. The TPCC workload was adulterated with index creation, index drop, complex-joins, temp-table creation, order-by and aggregate queries. In particular, FIG. 5 is a graph 500 illustrating entropy variation with an 80% adulteration probability on a production SQL workload in accordance with some embodiments. FIG. 6 is a graph 600 illustrating entropy variation with a 50% adulteration probability on a production SQL workload according to some embodiments.

The system was loaded with TPCC and a scale-factor of 18 (which loads approximately 21 GB of data) to PostgreSQL. However, the queries fired mostly hit the work mem and wal buffers knobs. The amount of work mem used by TPCC as shown in Table I is around 0.5 MB (much less than to generate a throttle from memory-based knobs). Hence, complex aggregation queries were added to TPCC (such as queries with heavy sorts), which requires nearby 350 MB. Still, the system was able to trigger throttle for only work mem using TPCC. To design a workload that triggers throttles from all defined classes/knobs, the system may start adding more queries and procedures. For example, the following queries (analyzing from production level performance bottlenecks faced earlier) might be added to TPCC bucket:

Complex sorts/aggregation queries (to trigger throttle from work_mem),

Create/Delete indexes (to trigger throttle from maintenance_work_mem),

Delete queries (to trigger throttle from maintenance_work_mem), and

Creating Temporary tables and firing complex aggregation queries on it (to trigger throttle from temp buffers).

The new queries may be added to the actual TPCC bucket based on probability as given in FIGS. 5 and 6 (80% and 50%). With the adulterated TPCC workload, the system may be able to simulate throttles from all set of classes/knobs. The probability distribution with TPCC may vary substantially from the probability distributions of adulterated TPCC due to absence of the new queries and results in entropy difference.

In connection with the background write knobs throttling detection 474, background writer knobs may control the writing of dirty pages from buffer back to the disk. This write process may be triggered by background writer processes or periodic checkpointing processes. However, if the checkpointing process is triggered too often and the amount of data written is high, then it may lead to higher values in consumption of IO throughput and disk latency resulting a decrease in throughput of the database. The other processes involved in writing dirty pages back to disk (background writer) helps mitigate the same problem, with the aim to reduce the amount of data written by a checkpointing process. Usually the background process writes a fixed number of pages back to disk and the left pages are taken care by checkpointing process. In case of write heavy workloads, the background process writes fixed amount of data causing uncertain amount of data written by a checkpointing process. Given a discrete configuration for the set of knobs, for identifying throttles the following set of challenges needs to be overcome:

To find out optimal value of checkpointing triggered per unit time. This parameter helps in understanding the overall period till which there can be a surge in disk latency, IO, etc.

To find out optimal value of data written to disk with trigger of a checkpoint. This parameter helps in understanding the max surge the disk IO and latency parameters can go for write operations.

There are various processes which write back to disk, for example—WAL writer, statistics writer, log writer, archiver, garbage collector, vacuum.

This makes it difficult to figure out holistically the exact amount of data written by checkpointing process.

To figure out the exact amount of data written by a specific process, use of User-level Statically Defined Tracing ("USDT") probes may be required. Note that any low-overhead tracing tool like an extended Berkley Packet Filter ("eBPF") or dtrace (Linux Foundation—IO Visor project) can use the probes to get information. The other option is to use kernel-probes (uprobes) for tracing, but this is also independent of the database process levels. Hence, the safest way to get this data is to move writing of majority of processes to another disk. Some approaches may change the disk for storing of WAL, statistics, logs, etc. Now only background writer processes or checkpointing processes and vacuum/garbage-collector processes are responsible for writing on the current disk (where the production database les are located). This strategy also guarantees SLA for minimum IOPS for a disk which stores the actual database and at the same time increases cost of extra hardware and operations. Still, the checkpointing process can be interpreted with the vacuum/garbage collector processes which is responsible for updating indexes for dead tuples and defragmenting pages on disk. The frequency of this process can easily be controlled, and the left slots can be utilized for monitoring of checkpointing processes. During experimentations, the frequency of vacuum/garbage collector may be increased to a substantially higher value (and neglect the monitoring of checkpointing during the interval when vacuum/garbage collectors are triggered).

To predict/evaluate the values of optimal checkpointing and optimal amount of data written per checkpoint, the proposed approach uses the historic data of the workloads stored in the tuner's database. The workloads which are generated for tuner, are often pre-generated offline or it considers newer workloads as well (workloads from live database systems). The tuner service for recommending new knob values selects a target workload, and then uses the target workloads data to train a Gaussian Process Regression ("GPR"). However, the disk latency may be monitored from external monitoring agents such as Dynatrace. The throttling point for these knobs depends upon the disk latency as the performance degrades when the disk latency increases. In order to figure the optimal checkpoint per unit time with amount of data written to disk, the time difference between peaks in disk-latency may be observed and averaged out for consecutive peaks. The system may define checkpointing per unit time based on the same observations. The checkpointing per unit time is calculated only for the highest observed throughout point in mapped workload.

Each database service in order to get the optimal parameters uses the best information seen/tried by tuner in past. Now, when a throttle is triggered, the tuner maps the current workload A (workload representing a target underlying database service) to a target workload B which had shown similar features in the past, with respect to the current workload. Both workloads A and B have many data points, where each data point is a combination of metrics (including throughput) and knobs. Now, for B, the timestamp value for the most optimal points observed (with respect to maximum throughput) are captured and passed on to the Dynatrace agent and the disk latency readings are collected. The points are the best recommended knob sets obtained using a trained GPR. From this data point, for the entire duration of workload execution on database, the checkpointing per unit time and respective disk latency is observed. Now on live/production systems, the checkpointing per unit time for A is calculated based on the baseline of disk-latency defined (obtained from tuner) earlier. If in A the ratio of checkpointing per unit time and disk latency is more than the ratio of checkpointing per unit time and disk latency for B, then the throttle-detection scripts trigger a throttle signal. However, there could still be scenarios, when the workload A has very less data points (configuration values vs metrics) and for such a scenario, the mappings are initially incorrect for target workloads. For that scenario, the number of throttles could be either more or less. However, each throttle signal that is triggered increases workload size (along with the probability of getting mapped to an optimal workload). Thus, embodiment may eventually improve in efficiency with passing time.

Figure 7:
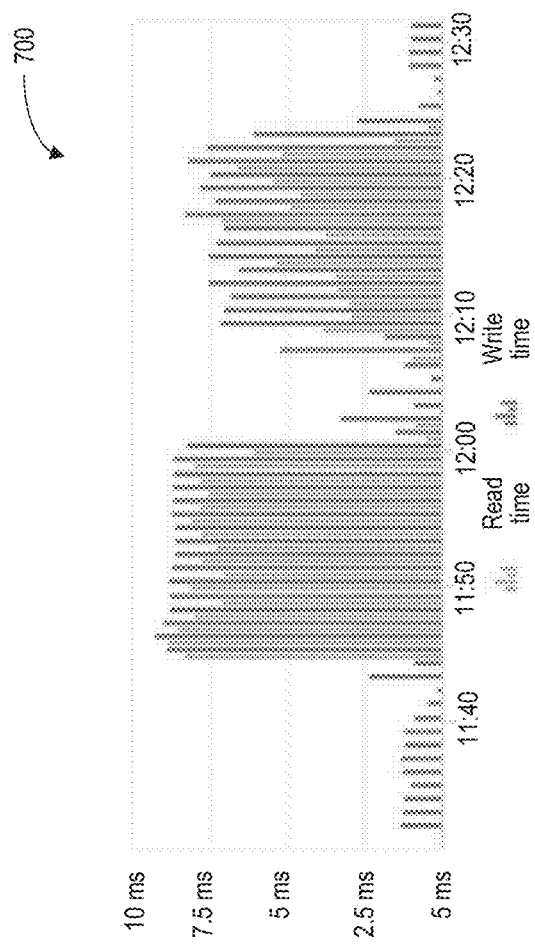
FIG. 7 is a graph illustrating disk latency for TPCC execution in accordance with some embodiments.

FIG. 7 is a graph 700 illustrating disk latency for TPCC execution in accordance with some embodiments. The graph 700 represents the disk latency incurred when TPCC is executed on PostgreSQL with default knob configuration values and compared with when it is executed with optimal knob configuration values. The readings observed from 11:45 to 12:05 show the disk latency values for TPCC execution with default knob values, and the readings observed from 12:10 to 12:25 show the disk latency values for TPCC execution with optimal configuration values on PostgreSQL. Here, the TPCC execution on tuned PostgreSQL gives an average disk-write latency of around 6.5 ms and based on this the checkpointing per unit time is obtained. As a result, this becomes the baseline for any workload on live systems which is mapped to the TPCC workload. Here, the major constraint is also that the underlying hardware (storage type as Solid-State Drive ("SSD") or Hard Disk Drive ("HDD")) should be the same for all systems (databases used for training tuner and live systems).

In connection with the asynchronous/planner estimate knobs throttling detection 476, the asynchronous knobs are based on the ability of the database to parallelize the query execution, whereas the planner estimate knobs helps the query execution planner to estimate the best route. Most of the database recommends to statically set the planner estimate knobs (random page cost, effective cache size, etc.) based on the underlying hardware capabilities. Still it is often seen that increasing/decreasing the values of such knobs (from the recommended values) improves the overall query execution. The asynchronous knobs are often defined by the number of parallel worker processes supported per relation by the database. During query execution, the parallel workers are taken from a pool of all defined workers. Often, it happens that the requested workers are not available, or it could also happen that setting a higher value for these knobs affects the planner estimates. Thus, it always depends upon the nature of query and to what degree it can support parallel executions.

As this category of knobs directly or indirectly impacts the planner estimates, it is often required to check the planners cost/benefit optimizations. The straightforward way to trigger a throttle would be to manually increase/decrease the knob values and check the overall cost/benefit optimizations. However, to automate this, the TDE needs to carefully take decision on whether to increase or decrease the value and by how much the value should be increased or decreased. Assuming at a given instance of time, for a given production workload, there exists an optimal value of these knobs. And the optimality does not depend on the underlying hardware (as per recommendations), making this a stochastic environment use case. Reinforcement learning is often seen as the best way for analyzing the cost/benefit optimizations of query execution planner. Hence, systems might use Learning Automata ("LA") because of its effective computational resource usage to solve the same set of challenges.

Figure 8:
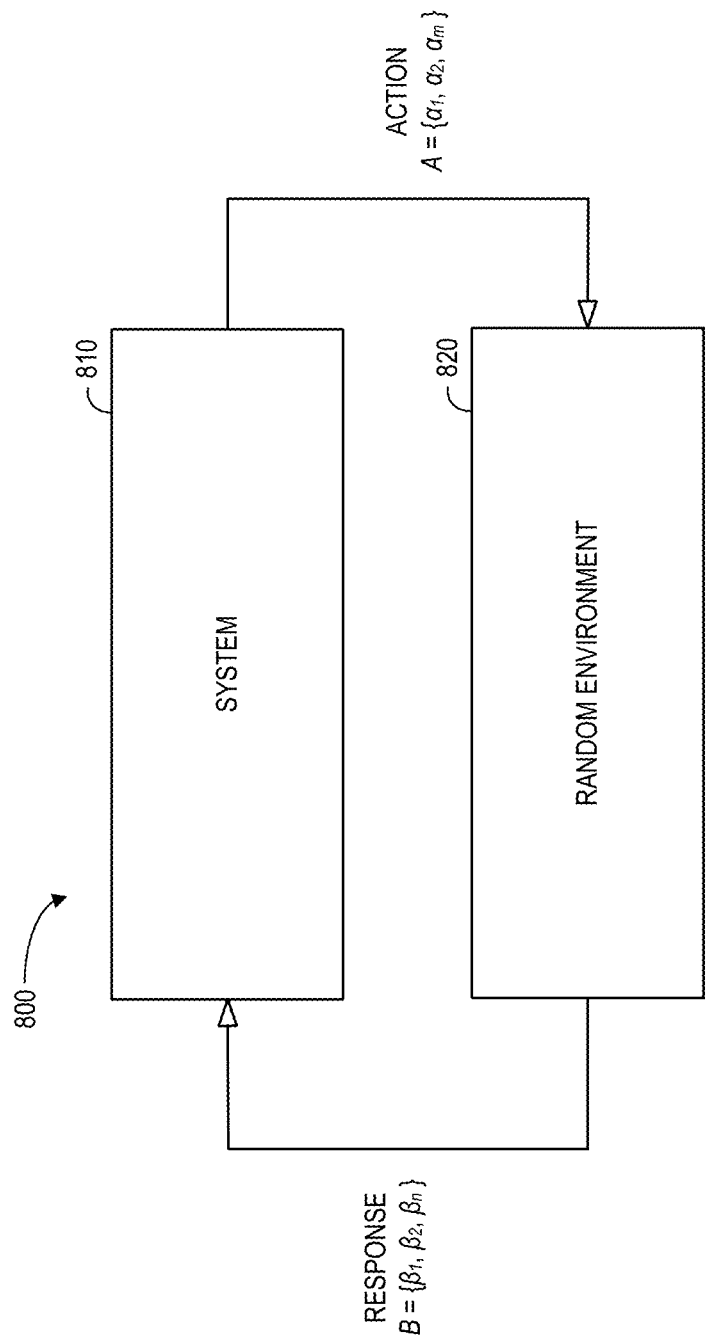
FIG. 8 is a learning automata architecture according to some embodiments.

A LA system may pick up a random action from an all possible action set and execute the action on an uncertain environment. To minimize the uncertainty, the automata starts with random and with course of actions performed, based on the response from the uncertain environment the action probabilities are adjusted. An abstract LA architecture 800 according to some embodiments is shown in FIG. 8. In particular, a system 810 provides an action to a random environment 820, which in turn provides a response back to the system 810.

The TDE may use the LA architecture 800 to trigger a throttle for this category of knobs (asynchronous/planner). From the given ranked knobs, the LA may figure out the cost/benefit optimizations for each of the async/planner estimate knobs. As the optimal values of knobs may change with a given workload, a Variable LA ("VLA") is formed and represented by {Q, A, B, N, H} in some embodiments. The system may model the given scenario where the VLA runs at the TDE layer and the environment is the database query planner. For a given knob, a VLA may be given as follows:

Q is the finite set of internal states given by $$Q = \{q_1, q_2, q_3, \ldots, q_n\},$$

where qn represents a specific knob value tried before or in current usage, $$A = \{\alpha_1, \alpha_2, \alpha_3, \ldots, \alpha_m\}$$

is the set of actions performed by the automata (increase/decrease the knob value) where each action has its own probability distribution, $$B = \{\beta_1, \beta_2, \beta_3, \ldots, \beta_n\}$$

is the response from the environment (cost/benefit calculated from query planner), N is a mapping function responsible to map current state and input to the next state, and H is a mapping function responsible to current state and response to figure out the action to be performed.

According to some embodiments, the TDE may trigger the LA at an interval of between two and four hours, where the LA performs cost/benefit analysis by fetching all the queries from log, performing reservoir sampling as described above (in throttling detection for memory knobs). For a given knob value (represented by $q_n$), based on the action probability, the LA increases/decreases the knob value. Later the TDE calculates the loss/profit in execution time against the sampled queries with respect to the new knob value and old knob value. If there is a loss (which signifies that the action is misleading), the LA penalizes the respective action (which adjusts the probability of the given action $\alpha_n$) and vice-versa. However, if a profit is seen with the change of the knob, then the TDE triggers a throttle to get a recommendation from the tuner.

Even though, over time, the LA learns about the optimal/sub-optimal values of the knobs, it may still be necessary to ask the tuner for recommendation. For example, the tuner may provide optimum changes with respect to a change in workload pattern, and the tuner may predict the best value of the given knob by prior data from other databases in a set of production systems.

The architecture 800 may be evaluated on cloud-foundry managed by Bosh running on AMAZON Web Services ("AWS"). On an average, embodiments may achieve a scalability of more than 64%. On production systems, due to varying load-throughput, embodiments may measure the performance of tuning recommendations in terms of performance throttles hit on production systems. Also, embodiments obtain an increase of 25% throughput compared to Ottertune, based on the effectiveness of newly created live workloads where the data in workload is a result of performance throttles only.

Figure 9:
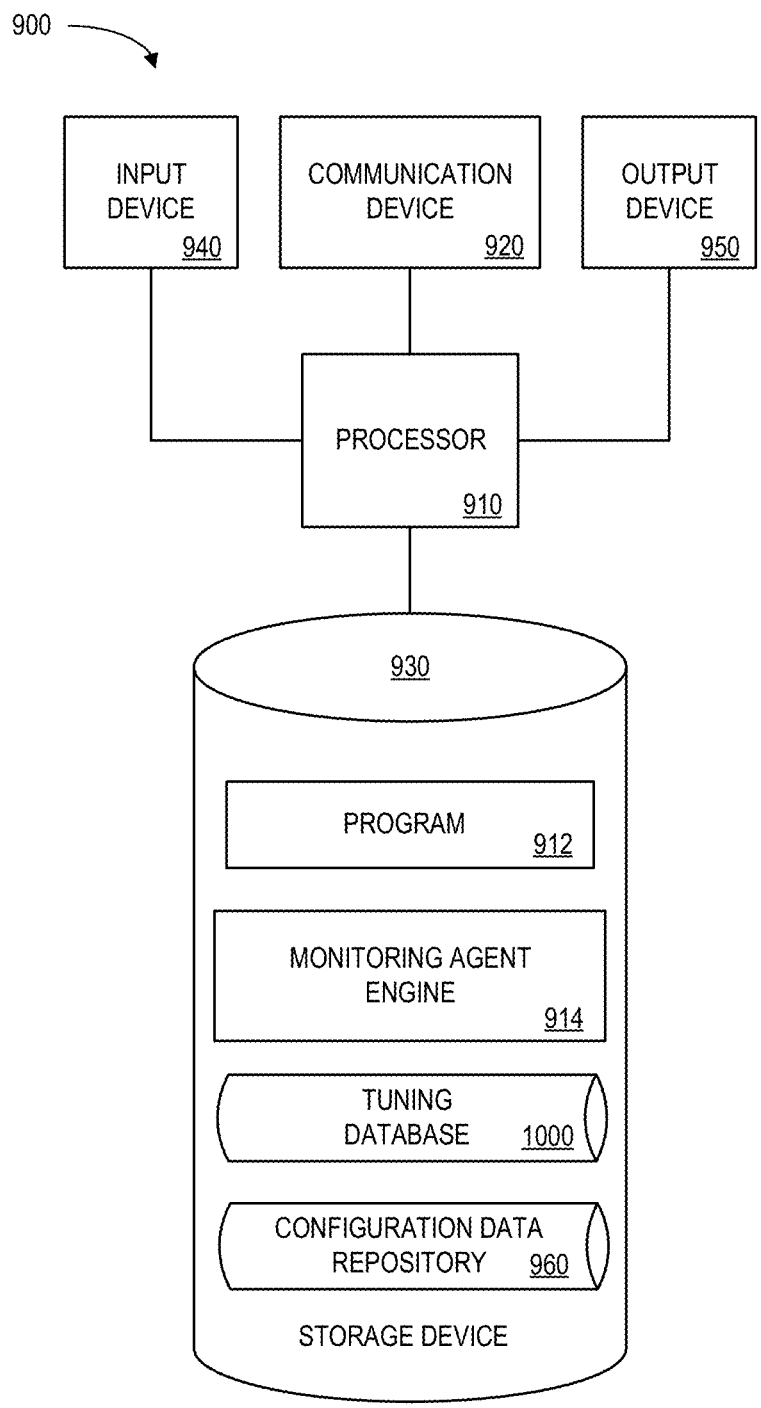
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the system 90 of FIG. 1 (and/or any other system described herein). The platform 900 comprises a processor 910, such as one or more commercially available Central Processing Units ("CPUs") in the form of one-chip microprocessors, coupled to a communication device 920 configured to communicate via a communication network (not shown in FIG. 9). The communication device 920 may be used to communicate, for example, with one or more remote user platforms, resource allocators, etc. The platform 900 further includes an input device 940 (e.g., a computer mouse and/or keyboard to input database or tuning information) and/an output device 950 (e.g., a computer monitor to render a display, transmit recommendations, and/or create database service reports). According to some embodiments, a mobile device and/or PC may be used to exchange information with the platform 900.

The processor 910 also communicates with a storage device 930. The storage device 930 can be implemented as a single database or the different components of the storage device 930 can be distributed using multiple databases (that is, different deployment information storage options are possible). The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or monitoring agent engine 914 for controlling the processor 910. The processor 910 performs instructions of the programs 912, 914, and thereby operates in accordance with any of the embodiments described herein. For example, the processor 910 may execute a monitoring agent, associated with a database service instance running on a client database virtual machine, that periodically executes a performance throttling detection engine. The processor 910 may gather database statistics based on metrics and features of the database service using a rule-based approach. When it is determined that a pre-determined condition is met, the processor 910 may transmit the gathered database statistics to an external application For example, the external application might comprise a database tuning service and the pre-determined condition may be associated with a decision that the database service may potentially need to tune knob configuration parameters.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores a configuration data repository 960 and a tuning database 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Figure 10:
FIG. 10 illustrates a tuning database in accordance with some embodiments.

Referring to FIG. 10, a table is shown that represents the tuning database 1000 that may be stored at the platform 1000 according to some embodiments. The table may include, for example, entries identifying tuning operations that have been performed (e.g., in a database tuning as a service environment). The table may also define fields 1002, 1004, 1006, 1008, 1010 for each of the entries. The fields 1002, 1004, 1006, 1008, 1010 may, according to some embodiments, specify: a tune request identifier 1002, database performance metrics 1004, a database identifier 1006, a recommended configuration 1008, and a trigger 1010. The tuning database 1000 may be created and updated, for example, when a throttling detection engine identifies a problem, etc.

The tune request identifier 1002 might be a unique alphanumeric label or link that is associated with a particular request from the throttling detection engine to create a new knob configuration for a database tuning as a service. The data performance metrics 1004 might reflect how the system was performing when the problem was identified. The database identifier 1006 might indicate which database needs tuning (e.g., so that an appropriate adapter may be selected). The recommended configuration 1008 may represent a new set of knob values that will help performance of the database tuning as a service. The trigger 1010 might indicate the type of knob that cause the throttling detection engine to transmit the tune request (e.g., a memory knob, a background writer knob, an asynchronous/planner knob, etc.).

Thus, embodiments may provide a performance throttling identification service for an autonomous database as a service in a fast, automatic, and accurate manner. Moreover, an increase database performance, productivity, efficiency, quality, etc. may be provided by the various embodiments described herein. Embodiments may provided a unified design and architecture across applications and databases, making them easier to use and maintain while optimizing performance. Note that no particular Information Technology ("IT") and DBA skills may be required (systems may benefit from fully automated management, fully automated patching, and automated upgrades). A provider may scale a data warehouse on demand and independently scale compute and/or storage resource (letting the provider shut off idle compute resources to save money and lower costs with elasticity).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
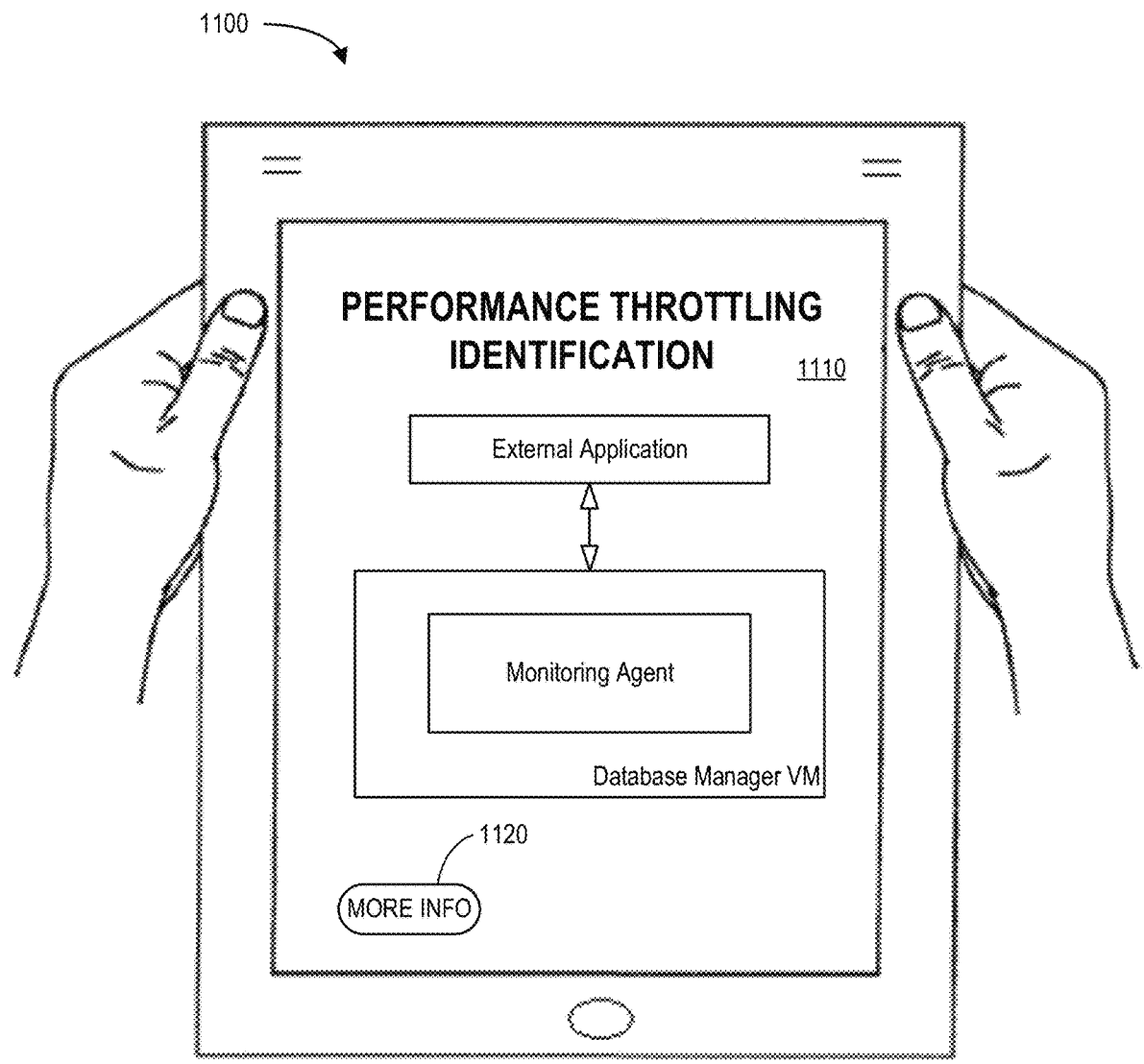
FIG. 11 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of knobs, any of the embodiments described herein could be applied to other types of knobs. For example, other embodiments may expand performance throttling using lock knobs (note that detecting throttles from lock-based knobs non-linearly depends on multiple parameter at a time making the problem complex). In addition, FIG. 11 shows a tablet computer 1100 rendering a performance throttling identification display 1110 or dashboard that may be used to adjust parameters associated with database statistics or to request additional information about the system (e.g., via "More Info" icon 1120).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud platform as a service provider, comprising:
 a monitoring agent, associated with a database service instance running on a client database virtual machine, adapted to:
  periodically execute a performance throttling detection engine,
  gather, by the performance throttling detection engine, database statistics based on metrics and features of the database service using a rule-based approach,
  use a probe to determine an amount of data written by a specific process of the database service instance,
  predict an amount of data written to the database service instance using historic workload data,
  average a time difference between peaks in disk-latency for consecutive peaks,
  decide that an external database tuning service application needs to tune a background writer knob configuration parameter based on the amount of data written, the predicted amount of data, and the averaged time difference, and
  when it is decided that the external database tuning service application needs to tune the background writer knob configuration parameter, transmit the gathered database statistics to the external database tuning service application.

2. The system of claim 1, wherein the gathered database statistics are associated with a dynamically calculated observation time.

3. The system of claim 1, wherein the gathered database statistics include at least one of: (i) a response time, (ii) a number of queued requests, (iii) a throughput, (iv) central processing unit usage, (v) memory usage, (vi) input output operations usage, and (vii) disk latency.

4. The system of claim 1, further comprising:
 a data federation agent, coupled to the database service instance, to:
  aggregate the gathered database statistics of the database service instance.

5. The system of claim 1, wherein the database service instance is associated with at least one of: (i) a relational database, (ii) a Structured Query Language ("SQL") database, (iii) a Not only SQL ("NoSQL") database, (iv) an in-memory database, (v) a messaging service, and (vi) an enterprise service bus.

6. The system of claim 1, wherein the monitoring agent is further adapted to:
 use a learning automata process to perform a cost/benefit analysis by fetching queries from a log using reservoir sampling, decide that the external database tuning service application needs to tune an asynchronous knob configuration parameter based on a result of the learning automata process, and when it is decided that the external database tuning service application needs to tune the asynchronous knob configuration parameter, transmit the gathered database statistics to the external database tuning service application.

7. The system of claim 6, wherein the monitoring agent is further adapted to:

use query templating to reduce a total number of queries for a cost/benefit analysis where queries collected from streaming logs are pre-processed and converted to generic query templates, select a generic query template to undergo execution plan evaluation by substituting most frequent parameters into the selected generic query template, decide that the external database tuning service application needs to tune a memory knob configuration parameter based on an inferred amount of memory a query will require based on the execution plan evaluation, and when it is decided that the external database tuning service application needs to tune the memory knob configuration parameter, transmit the gathered database statistics to the external database tuning service application.

8. A computer-implemented method associated with a database tuning as a service offered by a cloud platform as a service provider, comprising:

periodically executing, by a monitoring agent associated with a database service instance running on a client database virtual machine, a performance throttling detection engine;

gathering, by the performance throttling detection engine, database statistics based on metrics and features of the database service using a rule-based approach;

using a probe to determine an amount of data written by a specific process of the database service instance;

predicting an amount of data written to the database service instance using historic workload data;

averaging a time difference between peaks in disk-latency for consecutive peaks;

deciding that an external database tuning service application needs to tune a background writer knob configuration parameter based on the amount of data written, the predicted amount of data, and the averaged time difference; and when it is decided that a database tuner as a service needs to tune the background knob configuration parameter, transmitting the gathered database statistics to the database tuner as a service.

9. The method of claim 8, wherein the gathered database statistics are associated with a dynamically calculated observation time.

10. The method of claim 8, wherein the gathered database statistics include all of: (i) a response time, (ii) a number of queued requests, (iii) a throughput, (iv) central processing unit usage, (v) memory usage, (vi) input output operations usage, and (vii) disk latency.

11. The method of claim 8, wherein the database tuner as a service is spawned by the cloud provider as a Virtual Machine ("VM") ware, multi-tenant container.

12. The method of claim 8, further comprising:

aggregating, by a data federation agent, the gathered database statistics of the database service instance.

13. A non-transitory, computer readable medium having executable instructions stored therein, the medium comprising:

instructions to periodically execute, by a monitoring agent associated with a database service instance running on a client database virtual machine, a performance throttling detection engine;

instructions to gather, by the performance throttling detection engine, database statistics based on metrics and features of the database service using a rule-based approach; and instructions to use a probe to determine an amount of data written by a specific process of the database service instance;

instructions to predict an amount of data written to the database service instance using historic workload data;

instructions to average a time difference between peaks in disk-latency for consecutive peaks;

instructions to decide that an external database tuning service application needs to tune a background writer knob configuration parameter based on the amount of data written, the predicted amount of data, and the averaged time difference;

when it is decided that a database tuner as a service needs to tune the background writer knob configuration parameter, instructions to transmit the gathered database statistics to the database tuner as a service.

14. The medium of claim 13, wherein the database service instance is associated with at least one of: (i) a relational database, (ii) a Structured Query Language ("SQL") database, (iii) a Not only SQL ("NoSQL") database, (iv) an in-memory database, (v) a messaging service, and (vi) an enterprise service bus.

15. The medium of claim 13, further comprising:

instructions to aggregate, by a data federation agent, the gathered database statistics of the database service instance.

* * * * *